US007020476B2

(12) United States Patent
Day et al.

(10) Patent No.: US 7,020,476 B2
(45) Date of Patent: Mar. 28, 2006

(54) WIRELESS NETWORK SECURITY

(75) Inventors: Christopher W. Day, Biscayne Park, FL (US); Joseph M. Patterson, Coconut Creek, FL (US)

(73) Assignee: Steelcloud, Inc., Herndon, VA (US)

( * ) Notice: Subject to any disclaimer, the term of this patent is extended or adjusted under 35 U.S.C. 154(b) by 493 days.

(21) Appl. No.: 10/329,232

(22) Filed: Dec. 23, 2002

(65) Prior Publication Data

US 2004/0121787 A1    Jun. 24, 2004

(51) Int. Cl.
*H04Q 7/20* (2006.01)
(52) U.S. Cl. .............................. 455/456.5; 455/456.1; 455/421; 455/502
(58) Field of Classification Search ............. 455/456.5, 455/456.2, 456.1, 456.3, 457, 410, 411, 421, 455/454, 426.1, 502, 13.2, 208; 340/10.1; 342/357.07, 357.17, 450, 458
See application file for complete search history.

(56) References Cited

U.S. PATENT DOCUMENTS

| 5,216,429 | A | * | 6/1993 | Nakagawa et al. | ......... 342/465 |
| 5,596,330 | A | * | 1/1997 | Yokev et al. | ................ 342/457 |
| 5,835,857 | A | | 11/1998 | Otten | |
| 6,166,688 | A | | 12/2000 | Cromer et al. | |
| 6,310,576 | B1 | * | 10/2001 | Johnson | .................... 455/456.5 |
| 6,618,005 | B1 | * | 9/2003 | Hannah et al. | ........... 342/357.1 |
| 2002/0142782 | A1 | | 10/2002 | Berliner et al. | |

FOREIGN PATENT DOCUMENTS

| WO | WO 02/058267 | 7/2002 |
| WO | WO02/058267 | 7/2002 |
| WO | WO 02/058290 | 7/2002 |
| WO | WO02/058290 | 7/2002 |
| WO | WO 02/058346 | 7/2002 |
| WO | WO02/058346 | 7/2002 |

OTHER PUBLICATIONS

George A. Mizusawa, *Performance of Hyperbolic Position Location Techniques For Code Division Multiple Access*, Thesis submitted to the Faculty of the Virginia Polytechnic Institute and State University in partial fulfillment of the requirements for the degree of Master of Science in Electrical Engineering, pp. 1-32 (Aug. 1996).
*A Pratical Approach to Identifying and Tracking Unauthorized 802.11 Cards and Access Points*, Interlink Networks, ,http://www.interlinknetworks.com>, pp. 1-26, (2002), no month listed.

(Continued)

Primary Examiner—Eliseo Ramos-Feliciano
(74) Attorney, Agent, or Firm—Steven M. Greenberg, Esq.; Christopher & Weisberg, P.A.

(57) ABSTRACT

The present invention is secure wireless network. The secure wireless network can include multiple receiver nodes coupled to corresponding high-precision clocks. Each of the receiver nodes can be configured to receive wireless frames transmitted both within and outside a secured geographic area covered by the secure wireless network. A master synchronization high-precision clock can be coupled to the corresponding high-precision clocks. Additionally, a position location system can be coupled to the receiver nodes. Specifically, the position location system can be programmed to compute estimated positions for individual ones of wireless nodes transmitting the wireless frames. Finally, access management logic can be coupled to the position location system. More particularly, the access management logic can be configured to manage access to the wireless network by the individual ones of the wireless nodes based upon the computed estimated positions.

14 Claims, 3 Drawing Sheets

OTHER PUBLICATIONS

T. A. Wysocki, et al., *Chracterization of the indoor radio proparation channel at 2.4 GHz, Journal of Telecommunications and Information Technology*, pp. 84-90, (Mar. 2000).
*Spectrum24® Real Time Location System*, Symbol®, (Sep. 2002).

*Enabling Location Finding for Short-Range Wireless Networks, :: B Bluesoft Inc.*, <http://www.bluesoft-inc.com/techno_faq.asp>, (Nov. 2002).
H. Srivatsa, *Location-based security for wireless apps. IBM developerWirks*, no date listed.

* cited by examiner

WIRELESS NETWORK SECURITY

BACKGROUND OF THE INVENTION

1. Statement of the Technical Field

The present invention relates to network security and more particularly to wireless computer network security.

2. Description of the Related Art

Wireless local area network (LAN) technology has become an integral part of the modern computer network architecture. Falling prices and intuitive, low-tech installation requirements have resulted in the unstoppable proliferation of wireless LAN access points about the enterprise. Despite the cost-effective nature of the wireless LAN implementation, there is a cost which cannot be easily quantified. Namely, the unsupervised deployment of a wireless LAN within a hardened wire-bound network can produce a security hole which otherwise can render existing security measures irrelevant while compromising the network as a whole.

In particular, as wireless LAN technology is a technology which is intrinsically bound to radio frequency communications, would-be intruders can access the underlying communications medium of a wireless LAN, even from a position which is external to the enterprise, such as a nearby building or street. Conventional wireless network LAN access points typically lack security features, such as firewall capability, IPSEC, and intrusion detection processors. To that end, the hacking technique referred to in the art as "wardriving" or "warchalking" has become popular. In the warchalking scenario, an intruder can case a building with a laptop equipped with a wireless LAN network card configured to detect the presence of a wireless LAN.

Upon detecting the wireless LAN, the intruder can determine whether the detected wireless LAN is an "open" connection to the Internet, a "partially open" network which is open only to internal enterprise traffic, or a fully "closed" network. Based upon the findings of the intruder, a chalk marking or some other such indicia can be placed upon the face of the building so that other would-be intruders can identify an open wireless LAN access point without having to perform a separate detection process. To the casual observer, the indicia will seem like mere graffiti. To the skilled artisan, and in particular to a hacker, the indicia will represent an open opportunity to illegally access the wireless LAN and to inflict damage to the network infrastructure.

From the end-user perspective, most have considered the problem of wireless LAN security simply by recommending that information technologists identify "rogue" wireless access points and subsequently disable them. By comparison, from the manufacturing perspective, many have considered adding additional security features to wireless LAN access points so as to authenticate users prior to granting access to those users through the wireless LAN. Still, secure authentication in the wireless context differs little from authentication in all other computing contexts. That is to say, secure authentication measures can be circumvented by the unauthorized intruder in a wireless network just as the unauthorized intruder can circumvent secure authentication measures in the wire-bound circumstance.

Notably, manufacturers have not considered the problem of wireless LAN security as one of geography. In that regard, it will be apparent to one skilled in the art that, in the case of warchalking, the obvious distinction between an authorized user and an unauthorized user of the wireless LAN usually correlates to the geographic position of the user. Where the user remains outside of the premises, there is a high probability that the user is not authorized to access the network. Similarly, where the user remains within the premises, there is an equally high probability that the user is authorized to access the network.

U.S. Pat. No. 6,116,688 issued on Dec. 26, 2000 to Cromer et al. (Cromer), addresses the problem of using a portable computer outside of an authorized geographical area. Specifically, the Cromer specification relates to the disablement of a portable computer when the portable computer falls outside an authorized, geographical area. To effectuate the solution proposed in Cromer, the Cromer specification requires the attachment of a geographical positioning system (GPS) receiver within the portable computer so as to detect the position of the computer. Still, the technology disclosed within the Cromer specification presupposes the cooperation of the possessor of the portable computer. When applied to the context of network security, however, it is not reasonable to presume that an intruder will voluntarily incorporate a client-side tool for identifying the position of the intruder.

Similarly, Symbol Technologies, Inc. of Holtsville, N.Y., United States manufactures the Spectrum24® Real Time Location System in which inventory in the factory distribution setting can be tracked within a wireless LAN so as to locate, track and manage materials, component inventory "from the receiving dock to the warehouse to the assembly line". In furtherance of location function of the Spectrum24, Differential Time of Arrival (DTOA) technology can be applied in which the timing of the receipt of wirelessly transmitted identifiers from a transmitter can be associated with a particular location within a defined geographical area.

Nevertheless, the Spectrum24, like the Cromer technology, requires the coupling of an external device to the tracked asset. Specifically, whereas Cromer required that the portable computer incorporate a GPS receiver and client-side positioning logic, the Spectrum24 requires the affixation of a "Spectrum24 RTL Tag" to the article which is to be located. The tag itself can transmit the unique identifier to the wireless LAN access point upon which the DTOA analysis can be applied. Accordingly, neither the Cromer invention nor the Spectrum24 can be applied to the problem of wireless LAN security when considering unauthorized attempts to access a wireless LAN by an unknown intruder from a position falling geographically outside a permissible geographic boundary.

SUMMARY OF THE INVENTION

The present invention is secure wireless network. The secure wireless network can include multiple receiver nodes coupled to corresponding high-precision clocks. Each of the receiver nodes can be configured to receive wireless frames transmitted from both within and outside a secured geographic area covered by the secure wireless network. A master synchronization high-precision clock can be coupled to the corresponding high-precision clocks. Notably, the high-precision clocks and the master synchronization high-precision clock can include nano-second resolution.

Importantly, a position location system can be coupled to the receiver nodes. Specifically, the position location system can be programmed to compute estimated positions for individual ones of wireless nodes transmitting the wireless frames. Finally, access management logic can be coupled to the position location system. More particularly, the access management logic can be configured to manage access to the wireless network by the individual ones of the wireless nodes based upon the computed estimated positions.

In one aspect of the present invention, the position location system can include at least one two-dimensional position location system. In particular, the two-dimensional position location system can include one of a hyperbolic position location system or an elliptical position location system. In another aspect of the present invention, the position location system can include at least one three-dimensional position location system. In that case, the three-dimensional position location system can include one of a hyperboloidic position location system and an ellipsoid position location system.

In a preferred aspect of the present invention, the access management logic can include a mapping of the secured geographic area. To that end, one of an iconic and a textual indication of the computed estimated positions of the wireless nodes transmitting the wireless frames to the receiver nodes can be included about the mapping. Finally, a receiver node configurator can be programmed to both compute a range between a corresponding one of the receiver nodes and others of the receiver nodes, and alert an operator when the corresponding one of the receiver nodes has been moved.

A method for securing a wireless network from rogue access by unauthorized wireless nodes attempting to transmit wireless frames onto the wireless network, further can be provided. The method can include synchronizing individual high-precision clocks in different ones of at least four receiver nodes positioned in a secured area contained within the wireless network. Subsequently, a wireless frame can be received in at least three of the receiver nodes. Responsive to the receipt of the wireless frame in each of the receiver nodes, a time stamp can be recorded which denotes when the wireless frame had been received by each receiver node.

Importantly, for each pair of receiver nodes which have each received the wireless frame, the time stamps can be compared between the pairs to compute a set of differential hyperbolas. Subsequently, an intersection between the differential hyperbolas can be identified to establish a position estimate of a wireless node source of the wireless frame. Finally, access to the wireless network by the wireless node source can be managed based upon the position estimate.

Though the foregoing method can have application in two-dimensional space in which all of the receiver nodes are co-planar in nature, in a preferred aspect of the invention, the method of the invention can have application in three-dimensional space where not all receivers are co-planar in nature. In that case, the receiving step can include receiving a wireless frame in at least four of the receiver nodes. Also, the comparing step can include comparing the time stamps between the pairs to compute a set of differential hyperboloids. Similarly, the identifying step can include identifying an intersection between the differential hyperboloids to establish a three-dimensional position estimate of a wireless node source of the wireless frame. Finally, the managing step can include displaying a visual three-dimensional mapping of the secured area, and noting on the visual three-dimensional mapping the three-dimensional position estimate of the wireless node source of the wireless frame.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
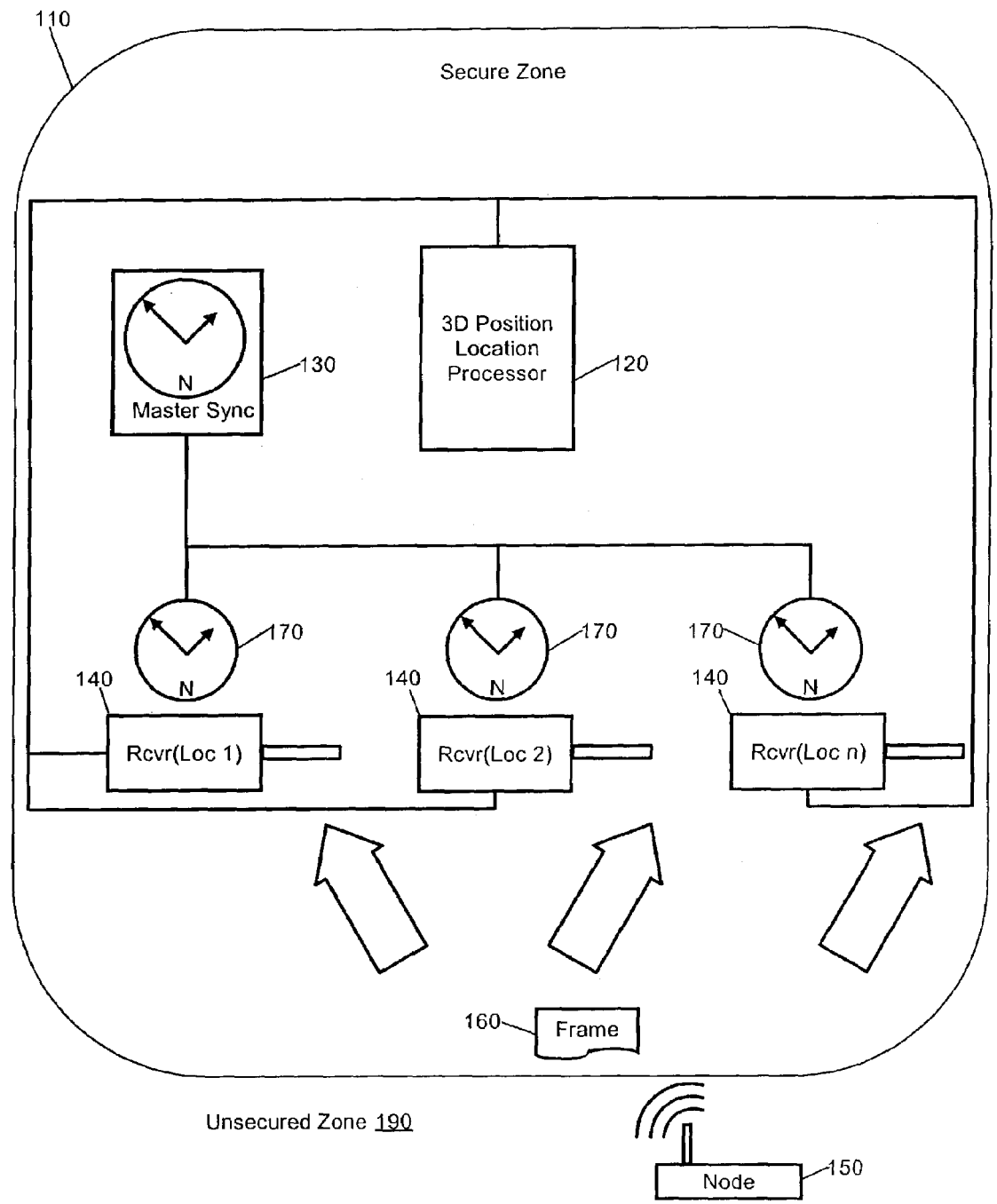
FIG. 1 is a schematic illustration of a wireless security system which has been configured in accordance with a preferred aspect of the present invention.

The present invention is a wireless security system. The wireless security system can identify and locate the source of wireless data packets in order to determine whether the source of the wireless data packets is permitted to access the wireless network and whether the location of the source falls within a permissible geographic location. Based upon both the identity and the location, the wireless security system can facilitate the management of network interactions between the packet source and the wireless network. The management can range from permitting or denying access to the wireless network, to limiting the type and nature of network access granted to the source.

Significantly, unlike conventional wireless location tracking technologies, in the wireless security system of the present invention the location and identity of the source of wireless packets can be determined without the explicit assistance of the source. That is to say, whereas convention wireless location tracking technologies require the coupling of an external article such as a GPS locator or identification tag to facilitate the location of the source, the wireless security system of the present invention requires no cooperation on the part of the source. Rather, in the preferred aspect of the present invention the source can be located passively based upon attributes of the wireless packet alone.

Notably, in a conventional wireless location and tracking system, assumptions regarding the source of a wireless packet necessarily form the basis of the location and identification of the source. These assumptions can include, for instance, the signaling characteristics of the source. Yet, a would-be intruder can modify the signal characteristics of the source so as to circumvent conventional position locating technologies. Accordingly, in the preferred aspect of the present invention, the position location of the source can be determined without having to make assumptions about the source other than the fact that the source has transmitted wireless traffic, such as 802.11 traffic. In that regard, it would be of no consequence if the source modified its own signaling characteristics. So long as the source transmits wireless packets which can be processed in the wireless security system, the system can identify and locate the source.

In a preferred aspect of the invention, a set of receiver nodes can be positioned strategically throughout a geographic area, such as an office building or office building complex. Each receiver can include a high resolution clock, preferably a nanosecond resolution or better clock. All receivers can be synchronized to within a nanosecond of differential time. Subsequently, each receiver can both note the time when the receiver receives a wireless frame, and also transmit the time of receipt to a central position location processor. Using the time of receipt data, the central position location processor can apply a position location process, for instance, a differential time of arrival process, to compute the location of the node based solely upon the time of receipt data forwarded by the receiver nodes for a received wireless frame.

Notably, once the location of the source of the wireless frame has been established, the location can be resolved graphically in reference to a mapping of the geographical area. Specifically, an iconic or textual indicator of the source can be displayed on a map of the geographical area monitored by the receiving nodes so as to indicate to an operator the location of the source. Where multiple sources can be monitored, the mapping literally can provide a "radar" scope of the wireless nodes of the network.

Importantly, the wireless security system of the present invention can be configured to raise an alert if an active wireless node is detected outside a permissible perimeter. Similarly, and most importantly, an alert can be raised if known-good credentials are used in two physically different places at once, thus implying that an intruder has hijacked valid user credentials. Hence, the wireless security system of the present invention can be valuable notwithstanding the use of encryption technology by a rogue node, so as to locate unauthorized nodes and access points or the unauthorized use of valid credentials.

Finally, the wireless security system can be configured to raise an alarm in the event the system detects a wireless node, but cannot locate the node due to a signal problem or a deficiency in the number of receiver nodes required to unambiguously locate the source of a wireless packet. In this way, an operator would at least recognize the presence of a suspicious node, even though the suspicious node cannot yet be located. In all cases, however, the wireless security system can be configured to disallow an unauthorized node by communicating with associated wireless access points or a centralized authorization server.

FIG. 1 is a schematic illustration of a wireless security system which has been configured in accordance with a preferred aspect of the present invention. In accordance with the inventive arrangements, a wireless security system can manage access to a wireless network as defined geographically in terms of secured 110 and unsecured 190 zones. Specifically, access generally can be permitted, albeit limited, when a wireless node 150 attempts to access the wireless network from within the secured zone 110, while access generally can be denied, albeit managed, when a wireless node 150 attempts to access the wireless network from the unsecured zone 190.

In furtherance of this objective, a set of four or more receiving nodes 140 can receive wireless frame transmissions 160 from wireless nodes 150. Based exclusively upon the contents of the wireless frame 160 and the time when the wireless frame 160 is received in each of the receiving nodes 140, the location of the transmitting node 150 can be determined. Notably, the receiving nodes 140 can be stand-alone receiving nodes coupled to the wireless network, or the receiving nodes 140 can be integrated as part of corresponding wireless access points defining the wireless network.

In any event, each of the receiving nodes 140 can have associated therewith a high precision clock 170, for instance a nano-second clock. The high precision clocks 170 can be cooperatively synchronized with a master high precision clock 130. In this way, each high precision clock 170 can affix a time stamp to a received wireless frame 160 which will be uniformly synchronized to the high precision clocks 170 of the other receiving nodes 140. Based upon the time stamps affixed to the receipt of a wireless frame 160 by multiple ones of the receiving nodes, a communicatively coupled position location processor 120 can determine the location of the source wireless node 150. In particular, the position location processor 120 can apply multilateral ellipsoid position location processing to establish an estimated geographical position for the wireless node 150 in three-dimensional space.

In accordance with the inventive arrangements, a DTOA technique referred to in the art as multilateration can be applied to locate the source of wireless frames in a secured wireless network. Specifically, in the present invention, to locate the source using multilateration, multiple sensors disposed in receiving nodes can receive a signal defining a wireless frame at slightly different times, due to their physical displacement. Each receiving node can note the time of arrival of the signal. Given that the speed of light, c, generally is a constant in a given transmission medium and that most wireless signals in the unlicensed 2.4 GHz spectrum pass through an air medium, it can be assumed that c is constant over the whole travel path of the signal.

Thus, the basic equation d=ct can be derived where d is the distance traveled by the signal and t is the time the signal consumed to travel from the wireless source to a given receiving node. For a pair of receivers, R1 and R2, the basic equation can yield both d1=ct1 and d2=ct2, producing d1−d2=c(t1−t2). If d1−d2=Δd, and t1−t2=Δt, Δd=cΔt. For a pair of receivers, then, the difference in those measured times can translate into differences in distance from the receivers, Δd. These differences will constrain the wireless source to a hyperbolic surface in space, with one of the receivers as the focus of the hyperbola.

For a different pair of receivers, R1 and R3 where R3 is not collinear with R1 and R2 a different Δd can be derived, referred to as d1−d3. From d1−d3, a new hyperbola can be computed. Based upon the arithmetic sign of Δd, the identity of the mirror hyperbola curves upon which the wireless source resides can be determined. When the curves are overlain upon one another, a pair of points can be localized in every plane, thus defining a spacial oval.

Significantly, one relevant measure includes the distance separating the receiving nodes, d1−d2. This value can factor into the hyperbolic equation and can be self-calibrated by the receivers. More particularly, the receiving nodes can automatically "know" their separation distance even when a receiving node has been re-positioned. In this way, the secure wireless network can recognize when a receiving node has been moved, and can alert an operator of the same.

Figure 2:
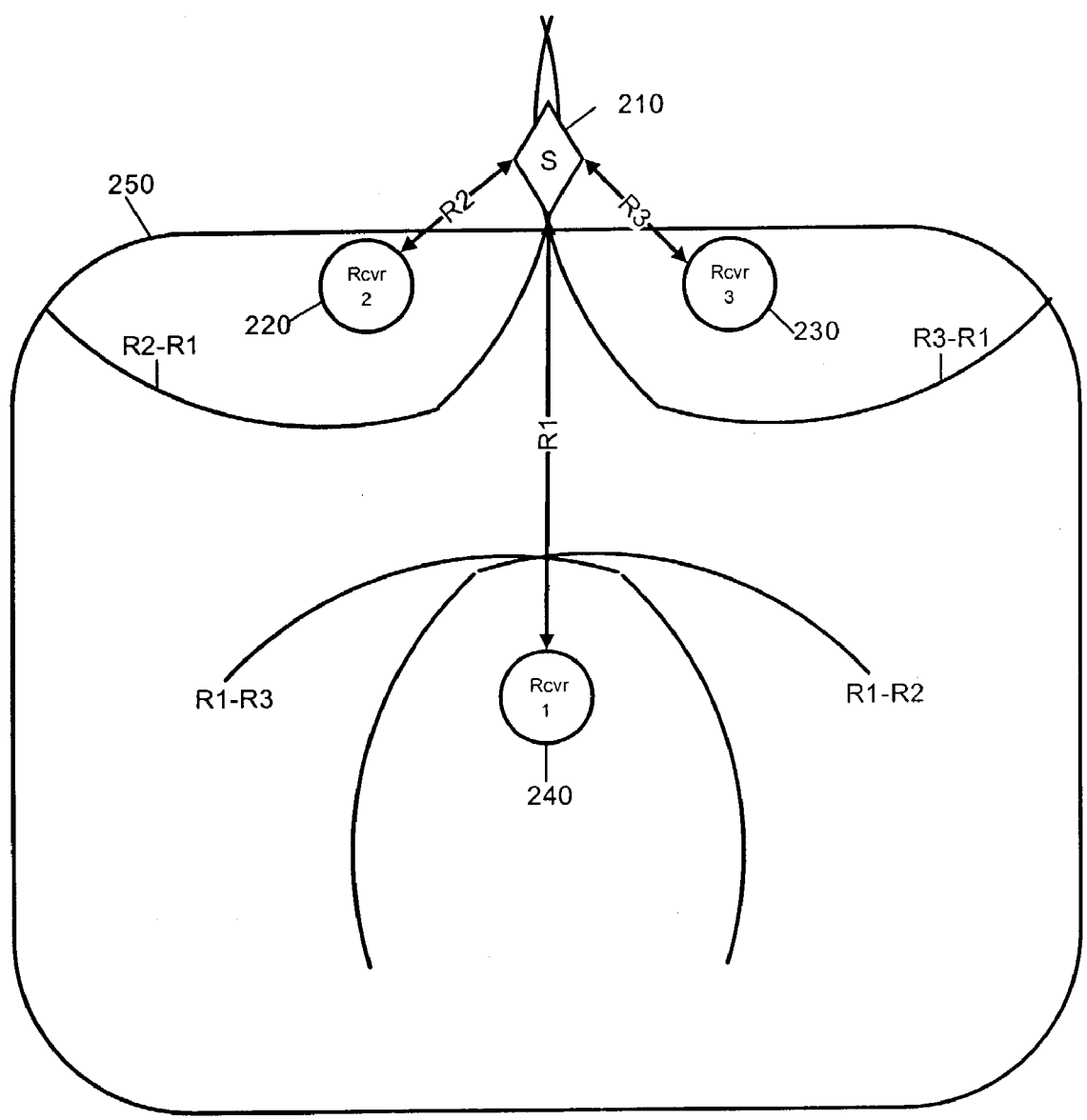
FIG. 2 is a diagrammatic illustration of a hyperbolic position locating implementation of the wireless security system of FIG. 1; and, FIG. 3 is a flow chart illustrating a process for managing wireless devices in the wireless security system of FIG. 1.

FIG. 2 is a diagrammatic illustration of the operation of a hyperbolic position locating implementation of the wireless security system of FIG. 1. Specifically, as shown in FIG. 2, a rogue wireless source 210 can attempt to transmit wireless frames to a wireless network which has been secured in accordance with the inventive arrangements. Multiple receiver nodes 220, 230, 240 can receive individual ones of the wireless frames from the wireless source 210 and can time stamp the received frames. Based upon the time stamp, range estimates R1, R2, R3 can be established for each receiver node 220, 230, 240.

Subsequently, applying well-known hyperbolic position location computations, a series of differential hyperbolas R2−R1, R3−R1, R1−R3, R1−R2 can be determined. Specifically, each of differential hyperbolas R2−R1, R3−R1, R1−R3, R1−R2 can be computed according to the equation $R_{i,j}=\sqrt{(X_i-x)^2+(Y_i-y)^2}-\sqrt{(X_j-x)^2+(Y_j-y)^2}$, where $R_{i,j}$ is the differential range between receiver node i and receiver node j. Notably, to extend the position location computation to three-dimensional space, a differential hyperboloid can be constructed according to the equation $R_{i,j}=\sqrt{(X_i-x)^2+(Y_i-y)^2+(Z_i-z)^2}-\sqrt{(X_j-x)^2+(Y_j-y)^2+(Z_i-z)^2}$.

The intersection of the differential hyperbolas R2−R1, R3−R1, R1−R3, R1−R2 can produce a position estimate for the wireless source 210. As the wireless source 210 in the exemplary illustration will lie outside of the secured zone 250, the wireless source 210 minimally can be viewed as suspicious, and likely would be viewed as a rogue wireless node. In either case, the secure wireless system can respond either by wholly denying subsequent access to the rogue wireless node, or limiting the access to specific resources and specific activities within the wireless node.

Figure 3:
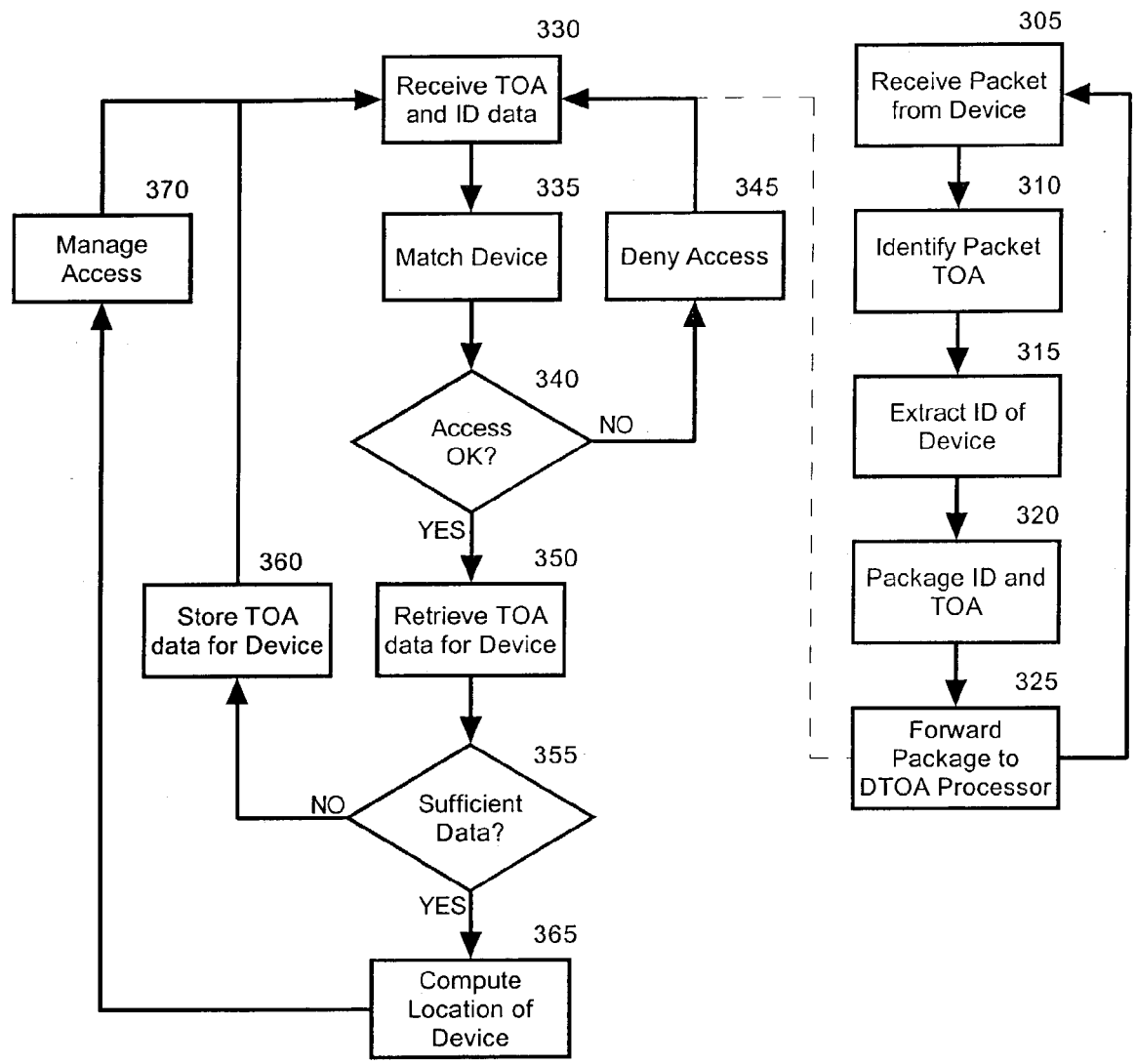

FIG. 3 is a flow chart illustrating an exemplary, albeit non-exclusive process for managing wireless devices in the wireless security system of FIG. 1. Beginning in blocks 305 through 325, each individual receiver node can receive and process wireless frames transmitted by wireless nodes. Specifically, in block 305, a wireless frame can be received from a wireless source node. In block 310, the receipt of the frame can be time-stamped. In block 315 the identification of the wireless source node can be extracted from the frame though it will be recognized by one skilled in the art that the authenticity of the identification cannot be presumed. In block 320, both the identification and the time-stamp can be packaged. Finally, in block 325, the package can be forwarded to a differential time of arrival (DTOA) processor and the receiver node can process the next received frame.

In block 330, the DTOA processor can receive packages from the respective receiver nodes. In block 335, for each package received, the DTOA processor can match the identification of the wireless source with a table of permitted wireless nodes. In decision block 340, if a match is not found, in block 345 access can be wholly denied to the wireless node by instructing associated wireless access points to block transmissions to and from the wireless node. If access is permissible, however, in block 350, previously stored time stamps can be retrieved for the device for the particular frame. In block 355, if insufficient time stamps have been stored so as to satisfy the requirements of the multilateration position location process, in block 360 the time-stamp for the frame and device can be stored and the process can return to block 330. Otherwise, in block 365, the multilateration position location process can compute the location of the wireless node and in block 370, access to the wireless network can be managed according to the computed position.

In this regard, the management of the access can vary from unfettered access to access which is based solely upon the location of the wireless node within the secured area. For instance, where different regions of the secured area involve varying levels of security, access can be more limited as the wireless nodes enter more secured regions of the secured area. Notwithstanding, "management" is not limited merely to the nature and type of access granted to the wireless node, but also to third-party monitoring of the wireless node. In this regard, the position of the wireless node can be overlain about a visual mapping of the secured area so that an operator can visually track the position of the wireless node.

The method of the present invention can be realized in hardware, software, or a combination of hardware and software. An implementation of the method of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A secure wireless network comprising:
    a plurality of receiver nodes coupled to corresponding high-precision clocks and configured to receive unsolicited wireless frames transmitted both from within and outside a secured geographic area covered by the secure wireless network;
    a master synchronization high-precision clock coupled to said corresponding high-precision clocks;
    a position location system coupled to said receiver nodes and programmed to compute estimated positions for individual ones of wireless nodes transmitting said wireless frames; and,
    access management logic coupled to said position location system and configured to manage access to the wireless network by said individual ones of said wireless nodes based upon said computed estimated positions.

2. The secure wireless network of claim 1, wherein said high-precision clocks and said master synchronization high-precision clock comprises nano-second resolution.

3. The secure wireless network of claim 1, wherein said position location system comprises at least one two-dimensional position location system selected from the group consisting of a hyperbolic position location system and an elliptical position location system.

4. The secure wireless network of claim 1, wherein said position location system comprises at least one three-dimensional position location system selected from the group consisting of a hyperboloidic position location system and an ellipsoid position location system.

5. The secure wireless network of claim 1, wherein said access management logic comprises a mapping of said secured geographic area and one of an iconic and a textual indication of said computed estimated positions of said wireless nodes transmitting said wireless frames to said receiver nodes.

6. The secure wireless network of claim 1, further comprising a receiver node configurator programmed both to compute a range between a corresponding one of said receiver nodes and others of said receiver nodes, and to alert an operator when a receiver node has been moved.

7. A method for securing a wireless network from rogue access by unauthorized wireless nodes attempting to transmit wireless frames onto the wireless network, the method comprising the steps of:
    synchronizing individual high-precision clocks in different ones of at least four receiver nodes positioned in a secured area contained within said wireless network;
    receiving an unsolicited wireless frame in at least three of said at least four receiver nodes;

responsive to said receipt of said unsolicited wireless frame in each of said receiver nodes, recording a time stamp denoting when said unsolicited wireless frame had been received;

for each pair of receiver nodes which have each received said unsolicited wireless frame, comparing said time stamps between said pairs to compute a set of differential hyperbolas;

identifying an intersection between said differential hyperbolas to establish a two-dimensional position estimate of a wireless node source of said unsolicited wireless frame; and, managing access to the wireless network by said wireless node source based upon said position estimate.

8. The method of claim 7, wherein said receiving step comprises the step of receiving an unsolicited wireless frame in at least four of said receiver nodes.

9. The method of claim 8, wherein said comparing step comprises the step of for each set of three of receiver nodes which have each received said unsolicited wireless frame, comparing said time stamps between said three receiver nodes to compute a set of differential hyperboloids, and wherein said identifying step comprises the step of identifying an intersection between said differential hyperboloids to establish a three-dimensional position estimate of a wireless node source of said unsolicited wireless frame.

10. The method of claim 9, wherein said managing step comprises the steps of:

displaying a visual three-dimensional mapping of said secured area; and, noting on said visual three-dimensional mapping said three-dimensional position estimate of said wireless node source of said unsolicited wireless frame.

11. A machine readable storage having stored thereon a computer program for securing a wireless network from rogue access by unauthorized wireless nodes attempting to transmit wireless frames onto the wireless network, the computer program comprising a routine set of instructions which when executed by the machine cause the machine to perform the steps of:

synchronizing individual high-precision clocks in different ones of at least four receiver nodes positioned in a secured area contained within said wireless network;

receiving an unsolicited wireless frame in at least three of said receiver nodes; responsive to said receipt of said unsolicited wireless frame in each of said receiver nodes, recording a time stamp denoting when said unsolicited wireless frame had been received;

for each pair of receiver nodes which have each received said unsolicited wireless frame, comparing said time stamps between said pairs to compute a set of differential hyperbolas;

identifying an intersection between said differential hyperbolas to establish a position estimate of a wireless node source of said unsolicited wireless frame; and, managing access to the wireless network by said wireless node source based upon said position estimate.

12. The machine readable storage of claim 11, wherein said receiving step comprises the step of receiving an unsolicited wireless frame in at least four of said receiver nodes.

13. The machine readable storage of claim 12, wherein said comparing step comprises the step of for each set of three of receiver nodes which have each received said unsolicited wireless frame, comparing said time stamps between said three receiver nodes to compute a set of differential hyperboloids, and wherein said identifying step comprises the step of identifying an intersection between said differential hyperboloids to establish a three-dimensional position estimate of a wireless node source of said unsolicited wireless frame.

14. The machine readable storage of claim 13, wherein said managing step comprises the steps of:

displaying a visual three-dimensional mapping of said secured area; and, noting on said visual three-dimensional mapping said three-dimensional position estimate of said wireless node source of said unsolicited wireless frame.

* * * * *